United States Patent
Chiou et al.

(10) Patent No.: US 9,308,706 B2
(45) Date of Patent: Apr. 12, 2016

(54) GRAPHITE OXIDE-CONTAINING RESIN FORMULATION, COMPOSITION, AND COMPOSITE THEREOF

(75) Inventors: Kuo-Chan Chiou, Tainan (TW); Lu-Shih Liao, Taichung (TW); Chen-Lung Lin, Longjing Township, Taichung County (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 148 days.

(21) Appl. No.: 13/439,151

(22) Filed: Apr. 4, 2012

(65) Prior Publication Data

US 2013/0065074 A1   Mar. 14, 2013

(30) Foreign Application Priority Data

Sep. 13, 2011   (TW) .............................. 100132813 A

(51) Int. Cl.
```
C08L 79/08      (2006.01)
C08K 3/20       (2006.01)
B32B 15/088     (2006.01)
B32B 27/02      (2006.01)
C09D 133/24     (2006.01)
H01G 4/20       (2006.01)
C08G 73/14      (2006.01)
```

(52) U.S. Cl.
CPC ............... B32B 15/088 (2013.01); B32B 27/02 (2013.01); C08G 73/14 (2013.01); C09D 133/24 (2013.01); H01G 4/206 (2013.01); C08K 3/20 (2013.01); C08L 79/08 (2013.01); Y10T 428/12438 (2015.01); Y10T 428/2933 (2015.01)

(58) Field of Classification Search
None
See application file for complete search history.

(56) References Cited

U.S. PATENT DOCUMENTS

| | | | |
|---|---|---|---|
| 3,598,241 A * | 8/1971 | Vondracek et al. | 210/321.9 |
| 4,089,813 A | 5/1978 | Alexander | |
| 5,602,213 A * | 2/1997 | Hsu et al. | 525/454 |
| 6,784,260 B2 | 8/2004 | Yeager et al. | |
| 7,518,064 B2 | 4/2009 | Morioka et al. | |
| 7,691,473 B2 | 4/2010 | Yano et al. | |
| 7,700,185 B2 * | 4/2010 | Kumashiro et al. | 428/323 |
| 2002/0172786 A1 * | 11/2002 | Matsuoka et al. | 428/35.7 |
| 2006/0084787 A1 | 4/2006 | Sugano et al. | |
| 2007/0092432 A1 * | 4/2007 | Prud'Homme et al. | 423/448 |
| 2008/0047117 A1 | 2/2008 | Borland et al. | |
| 2008/0262139 A1 | 10/2008 | Wu et al. | |
| 2009/0143515 A1 * | 6/2009 | Herrera-Alonso et al. | 524/186 |
| 2009/0292062 A1 | 11/2009 | He et al. | |
| 2010/0018756 A1 * | 1/2010 | Shimeno et al. | 174/254 |
| 2010/0142872 A1 | 6/2010 | Egami et al. | |
| 2010/0210745 A1 | 8/2010 | McDaniel et al. | |
| 2011/0049437 A1 * | 3/2011 | Crain et al. | 252/511 |
| 2011/0052813 A1 * | 3/2011 | Ho et al. | 427/256 |
| 2011/0086206 A1 | 4/2011 | Scheffer et al. | |
| 2012/0197366 A1 * | 8/2012 | Zeijlemaker et al. | 607/116 |
| 2012/0228542 A1 * | 9/2012 | l'Abee et al. | 252/74 |
| 2013/0190449 A1 * | 7/2013 | Kinloch et al. | 525/50 |

FOREIGN PATENT DOCUMENTS

| | | |
|---|---|---|
| CN | 1791947 A | 6/2006 |
| CN | 101990518 A | 3/2011 |
| JP | 2003-138241 A | 5/2003 |
| JP | 2004-217861 A | 8/2004 |
| TW | I318991 | 1/2010 |
| WO | WO 03/048251 A1 | 6/2003 |

OTHER PUBLICATIONS

Cai et al., "Preparation of fully exfoliated graphite oxide nanoplatelets in organic solvents", Journal of Materials Chemistry, vol. 17, 2007, pp. 3678-3680.
Lee et al., "Development of Halogen-Free and Phosphorous-Free Dielectric Material for Highly Thermal Conductivity Copper Clad Laminate", IMPACT 2008, pp. 624-627.
Liao, "Thermal Conductive Dielectric Materials for High Power LED Substrate", Industrial Materials May 1, 2010, pp. 90-98.
Liao, "The Technology and Applications of Environmentally-Friendly Dielectric Insulation Materials for Chip-in-Substrate Package", Advanced Microsystem and Packaging Quarterly Jul. 1, 2007, pp. 11-21.
The Office Action issued on Sep. 17, 2013 in the corresponding Taiwanese Patent Application No. 100132813.
The Office Action, dated Apr. 24, 2014, issued in the corresponding Chinese Patent Application No. 201110349047.5.
The Office Action, dated May 8, 2014, issued in the corresponding Taiwanese Patent Application No. 100132813.

\* cited by examiner

*Primary Examiner* — Elizabeth A Robinson
*Assistant Examiner* — Daniel D Lowrey
(74) *Attorney, Agent, or Firm* — Birch, Stewart, Kolasch & Birch, LLP

(57) ABSTRACT

The present disclosure relates to a graphite oxide-containing resin formulation, including: 15-80 parts by weight of a polyamideimide precursor, 0.01-10 parts by weight of a graphite oxide as a dispersant, 10-400 parts by weight of an inorganic powder, and 20-350 parts by weight of a solvent.

3 Claims, No Drawings

GRAPHITE OXIDE-CONTAINING RESIN FORMULATION, COMPOSITION, AND COMPOSITE THEREOF

CROSS REFERENCE TO RELATED APPLICATIONS

This application claims priority of Taiwan Patent Application No. 100132813, filed on Sep. 13, 2011, the entirety of which is incorporated by reference herein.

TECHNICAL FIELD

This technical field relates to graphite oxide-containing resin formulation, composition, and composite thereof.

BACKGROUND

Current high-dielectric or high thermal radiation resins have a non-uniform dispersion problem. Meanwhile, a phosphide is commonly chosen as a flame retardant to replace halogen compounds in the halogen-free composition. Moreover, in order to reduce the phosphor content, aluminum hydroxide is employed to meet UL-94 V0 fire rating.

SUMMARY

The present embodiment provides a graphite oxide-containing resin formulation, comprising: 15-80 parts by weight of a polyamideimide precursor; 0.01-10 parts by weight of a graphite oxide as a dispersant; 10-400 parts by weight of an inorganic powder; and 20-350 parts by weight of a solvent.

The present embodiment further provides a graphite oxide-containing resin composition, comprising: 15-80 parts by weight of a polyamideimide resin; 0.01-10 parts by weight of a graphite oxide as a dispersant; and 10-400 parts by weight of an inorganic powder.

The present embodiment further provides a graphite oxide-containing resin composite, comprising: a substrate; and the graphite oxide-containing resin composition. The substrate may be a fiber or a pair of metal foils.

A detailed description is given in the following embodiments.

DETAILED DESCRIPTION

The present embodiment provides a graphite oxide-containing resin formulation, a graphite oxide-containing resin composition, and a composite produced from the previously mentioned formulation, and a method for dispersing an inorganic powder. The graphite oxide-containing resin formulation is generally composed of a polyamideimide precursor, graphite oxide as a dispersant, an inorganic powder, and a solvent, wherein the graphite oxide serves as a dispersant to promote the dispersibility of the inorganic powder.

The graphite oxide-containing resin formulation may comprise: 15-80 parts or 30-60 parts by weight of a polyamideimide precursor; 0.01-10 parts, 0.05-8 parts, or 0.1-6 parts by weight of a graphite oxide as a dispersant; 10-400 parts, 15-320 parts or 20-145 parts by weight of an inorganic powder; and 20-350 or 30-100 parts by weight of a solvent.

The method for dispersing an inorganic powder may comprise: providing a precursor solution, comprising: 15-80 parts or 30-60 parts by weight of a polyamideimide precursor; and then adding 0.01-10 parts, 0.05-8 parts, or 0.1-6 parts by weight of a graphite oxide as a dispersant, 10-400 parts, 15-320 parts or 20-145 parts by weight of an inorganic powder, and 20-350 parts or 30-100 parts by weight of a solvent to the precursor solution with stirring to form a graphite oxide-containing resin formulation.

The graphite oxide-containing resin composition may comprise: 15-80 parts or 30-60 parts by weight of a polyamideimide resin; 0.01-10 parts, 0.05-8 parts, or 0.1-6 parts by weight of a graphite oxide as a dispersant; and 10-400 parts, 15-320 parts or 20-145 parts by weight of an inorganic powder.

In an embodiment, the polyamideimide precursor of the graphite oxide-containing resin formulation may comprise: 2.5-25 parts or 5.5-20 parts by weight of carboxy anhydride; 5-30 parts or 7-24 parts by weight of diisocyanate; and 10-55 parts or 18-38 parts by weight of bismaleimide.

The carboxy anhydride may be tri-functional derivations, and may have the formula (I) as below:

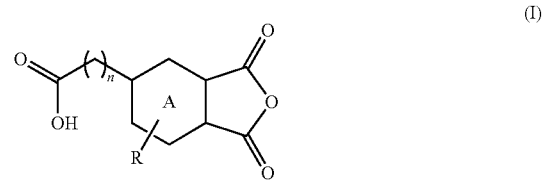

wherein A is phenyl or cyclohexyl; R is H, $CH_3$, or COOH, and n is an integer of 0-8. Examples of the tri-functional carboxy anhydride include, but are not limited to, trimellitic anhydride (TMA), cyclohexane-1,2,4-tricarboxylic acid-1,2-anhydride (c-TMA), or combinations thereof.

The diisocyanate may be phenyl-containing derivatives, which include, but are not limited to: methylene diphenyl diisocyanate (MDI), toluene diisocyanate (TDI), isophorone diisocyanate (IPDI), or combinations thereof.

The inorganic powder of the present embodiment may include, but is not limited to: high-dielectric-constant powder, or high thermal radiation powder. The high-dielectric-constant powder may include, but is not limited to: barium titanate, strontium titanate, barium oxide, calcium titanate, barium strontium titanate, lead zirconate titanate, lead magnesium niobate, or combinations thereof. The high thermal radiation powder may comprise: silicon carbide, zirconium dioxide, cerium(IV) oxide, carbon fiber, carbon nanotube, or combinations thereof. The particle size for the inorganic powder may range between 50-100000 nm, the dielectric constant for the inorganic powder may range between 5-50000, and the emissivity for the high thermal radiation powder may range between 0.85-1.

The graphite of the present embodiment may have a thickness of 0.3-30 nm. In an embodiment, the graphite may be subjected to a chemical pretreatment before it is added to the graphite oxide-containing resin formulation of the present embodiment.

In an embodiment, aluminum oxide, silicon oxide, or combinations thereof may be optionally added to serve as the dispersant of the graphite oxide-containing resin formulation.

The graphite oxide used in the present embodiment is prepared by Hummer's method (J. Am. Chem. Soc., 80, 1339, 1958) or Staudenmaier method (Ber. Dtsch. Chem. Ges., 31, 1481, 1898), wherein potassium permanganate ($KMnO_4$) as an oxidant is added to the graphite (particle size of about 10~100 μm) under a strong acid environment such as sulfuric acid, nitric acid, etc. After reaction for 1-10 days, the acid solution and potassium permanganate are washed off, followed by centrifugation and filtration to obtain the graphite oxide. The graphite oxide refers to delaminated graphite which has a large amount of oxygen-containing functional groups, such as carboxylic groups (—COOH), hydroxyl groups (—OH), carbonyl groups (C=O), and epoxy groups, and has a thickness between 0.3 nm and 30 nm. The graphite oxide can serve as the dispersant of a high-dielectric-constant powder as well as promote the dispersibility of the high thermal radiation powder. Thermal radiation powder easily settles at the bottom of the composite resin formulation leading to difficulties when subsequent processing is performed. Moreover, when the formulation is coated into a film, this sedimentation feature makes the high thermal radiation powder be easily encapsulated by the resin, thereby reducing thermal radiation efficiency. The graphite oxide may defer the sedimentation time of the thermal radiation powder in the high thermal radiation resin formulation, and thereby the high thermal radiation resin formulation may be applied to various kinds of coating process, such as blade coating, air gun coating, and brush coating, to provide a more uniform coating and improved thermal radiation efficiency for cooling.

The high thermal radiation resin formulation may be applied to various kinds of heat sources for cooling through a transformation from waste heat to thermal radiation, thereby lowering the temperature of the heat sources.

The solvent in the graphite oxide-containing resin formulation may be chosen depending on the polyimide precursor used. Examples of the solvents include, but are not limited to: dimethyl formamide (DMF), N-methyl-2-pyrrolidone (NMP), dimethyl sulfoxide (DMSO), or combinations thereof.

In an embodiment, the method for preparing the graphite oxide-containing resin composite using the graphite oxide-containing resin formulation may comprise: coating the graphite oxide-containing resin formulation to metal foils, such as copper foils followed by a laminating process at a temperature of approximately 190-210° C., such as 200° C. and pressed for 2-4 hours, such as 3 hours to obtain a graphite oxide-containing resin composite for use in a slim capacitor.

In another embodiment, the method for preparing the graphite oxide-containing resin composite using the graphite oxide-containing resin formulation comprises: impregnating a fiber in the graphite oxide-containing resin formulation, followed by heating and curing of the fiber impregnated the graphite oxide-containing resin formulation at a temperature of approximately 180-220° C. or approximately 180-200° C., for about 1-6 hours or 1-3 hours to obtain a graphite oxide-containing resin composite which may be a thin capacitor. In an embodiment, the fiber used in the graphite oxide-containing resin composite may comprise: glass fiber fabric or polyamide fiber.

The resin composite produced by the method of some embodiments is halogen-free and phosphor-free, and can meet the UL-94 V0 fire rating. The resin composite has a dielectric constant between about 10-30, or about 21-23, and a glass transition temperature higher than 180° C., or 204-211° C.

The resin composite of the embodiment is eco-friendly and characterized by high thermal-resistance or high-dielectric-constant, and a Tg of above 180° C., which can be applied in high thermal-retardant or built-in capacitive substrate materials for advances. The resin composite is a green material with desirable chemical and physical properties that can be readily incorporated into various electronic devices.

The making and using of the embodiments of the disclosure are discussed in detail below. It should be appreciated, however, that the embodiments provide many applicable inventive concepts that can be embodied in a wide variety of specific contexts. The specific embodiments discussed are merely illustrative, and do not limit the scope of the disclosure.

Preparation Example

Pretreatment of the Graphite Oxide

The graphite oxide used in the present embodiment was prepared by Hummer's method (J. Am. Chem. Soc., 80, 1339, 1958) or Staudenmaier method (Ber. Dtsch. Chem. Ges., 31, 1481, 1898), wherein potassium permanganate ($KMnO_4$) as an oxidant was added to the graphite (particle size of about 40 μm) with the presence of sulfuric acid. After reaction for 2 days, the acid and potassium permanganate were washed off, followed by centrifugation and filtration to obtain the graphite oxide. The delaminated graphite oxide prepared by the above mentioned method had a large amount of oxide-containing functional groups, such as carboxylic groups (—COOH), hydroxyl groups (—OH), carbonyl groups (C=O), and epoxy groups, and had a thickness between 0.3 nm and 30 nm.

Example 1

6.2 g TMA (trimellitic anhydride, Fu-Pao Chemical Co.), 20.7 g BMI (bismaleimide, KI Chemical Co.), 8.2 g MDI (methylene diphenyl isocyanate, Fu-Pao Chemical Co.), and 64.9 g DMF (dimethylformamide, C-ECHO Co.) were added into a 500 ml three-inlet glass reactor having two agitating blades, and then stirred at a temperature of 105° C. After the reaction was completed, the temperature was cooled to room temperature to obtain the flame retardant. Then, 108 g of barium titanate (Seedchem Co.) and 1.1 g of graphite oxide (from preparation example) were added to the resin formulation at room temperature to form a high-dielectric-constant formulation varnish. Finally, two copper foils were coated with the varnish respectively, and then the coated copper foils were laminated face to face at a temperature of 200° C. and pressed for 3 hours to obtain a slim capacitor.

Example 2

6.2 g TMA (trimellitic anhydride, Fu-Pao Chemical Co.), 20.7 g BMI (bismaleimide, KI Chemical Co.), 8.2 g MDI (methylene diphenyl isocyanate, Fu-Pao Chemical Co.), and 64.9 g DMF (dimethylformamide, C-ECHO Co.) were added into a 500 ml three-inlet glass reactor having two agitating blades, and then stirred at a temperature of 105° C. After the reaction was completed, the temperature was cooled to room temperature to obtain the flame retardant. Then, 20.9 g of barium titanate (Seedchem Co.) and 0.2 g of graphite oxide (preparation example) were added to the resin formulation at room temperature to form a high-dielectric-constant formulation varnish. Finally, two copper foils were coated with the varnish respectively, and then the coated copper foils were laminated face to face at a temperature of 200° C. and pressed for 3 hours to obtain a slim capacitor.

Example 3

6.2 g TMA (trimellitic anhydride, Fu-Pao Chemical Co.), 20.7 g BMI (bismaleimide, KI Chemical Co.), 8.2 g MDI (methylene diphenyl isocyanate, Fu-Pao Chemical Co.), and 64.9 g DMF (dimethylformamide, C-ECHO Co.) were added into a 500 ml three-inlet glass reactor having two agitating blades, and then stirred at a temperature of 105° C. After the reaction was completed, the temperature was cooled to room temperature to obtain the flame retardant. Then, 108 g of barium titanate (Seedchem Co.) and 4.5 g of graphite oxide (preparation example) were added to the resin formulation at room temperature to form a high-dielectric-constant formulation varnish. Finally, two copper foils were coated with the varnish respectively, and then the coated copper foils were laminated face to face at a temperature of 200° C. and pressed for 3 hours to obtain a slim capacitor.

Example 4

6.2 g TMA (trimellitic anhydride, Fu-Pao Chemical Co.), 20.7 g BMI (bismaleimide, KI Chemical Co.), 20.2 g MDI (methylene diphenyl isocyanate, Fu-Pao Chemical Co.), and 64.9 g DMF (dimethylformamide, C-ECHO Co.) were added into a 500 ml three-inlet glass reactor having two agitating blades, and then stirred at a temperature of 105° C. After the reaction was completed, the temperature was cooled to room temperature to obtain the flame retardant. Then, 108 g of barium titanate (Seedchem Co.) and 1.1 g of graphite oxide (preparation example) were added to the resin formulation at room temperature to form a high-dielectric-constant formulation varnish. Finally, two copper foils were coated with the varnish respectively, and then the coated copper foils were laminated face to face at a temperature of 200° C. and pressed for 3 hours to obtain a slim capacitor.

Example 5

6.2 g TMA (trimellitic anhydride, Fu-Pao Chemical Co.), 20.7 g BMI (bismaleimide, KI Chemical Co.), 8.5 g IPDI (isophorone diisocyanate, Fu-Pao Chemical Co.), and 64.9 g DMF (dimethylformamide, C-ECHO Co.) were added into a 500 ml three-inlet glass reactor having two agitating blades, and then stirred at a temperature of 105° C. After the reaction was completed, the temperature was cooled to room temperature to obtain the flame retardant. Then, 108 g of barium titanate (Seedchem Co.) and 1.1 g of graphite oxide (preparation example) were added to the resin formulation at room temperature to form a high-dielectric-constant formulation varnish. Finally, two copper foils are coated with the formulation varnish respectively, and then the two copper foils coated with the formulation varnish were laminated face to face followed by heating and pressurization at a temperature of 200° C. for 3 hours to obtain a thin capacitor.

Example 6

6.2 g TMA (trimellitic anhydride, Fu-Pao Chemical Co.), 35.1 g BMI (bismaleimide, KI Chemical Co.), 8.2 g MDI (methylene diphenyl isocyanate, Fu-Pao Chemical Co.), and 64.9 g DMF (dimethylformamide, C-ECHO Co.) were added into a 500 ml three-inlet glass reactor having two agitating blades, and then stirred at a temperature of 105° C. After the reaction was completed, the temperature was cooled to room temperature to obtain the flame retardant. Then, 108 g of barium titanate (Seedchem Co.) and 1.1 g of graphite oxide (preparation example) were added to the resin formulation at room temperature to form a high-dielectric-constant formulation varnish. Finally, two copper foils were coated with the varnish respectively, and then the coated copper foils were laminated face to face at a temperature of 200° C. and pressed for 3 hours to obtain a slim capacitor.

Example 8

6.4 g c-TMA (Cyclohexane-1,2,4-tricarboxylic acid-1,2-anhydride, Fu-Pao Chemical Co.), 20.7 g BMI (bismaleimide, KI Chemical Co.), 8.5 g IPDI (isophorone diisocyanate, Fu-Pao Chemical Co.), and 64.9 g DMF (dimethylformamide, C-ECHO Co.) were added into a 500 ml three-inlet glass reactor having two agitating blades, and then stirred at a temperature of 105° C. After the reaction was completed, the temperature was cooled to room temperature to obtain the flame retardant. Then, 108 g of barium titanate (Seedchem Co.) and 1.1 g of graphite oxide (preparation example) were added to the resin formulation at room temperature to form a high-dielectric-constant formulation varnish. Finally, two copper foils were coated with the varnish respectively, and then the coated copper foils were laminated face to face at a temperature of 200° C. and pressed for 3 hours to obtain a slim capacitor.

Example 9

6.4 g c-TMA (Cyclohexane-1,2,4-tricarboxylic acid-1,2-anhydride, Fu-Pao Chemical Co.), 20.7 g BMI (bismaleimide, KI Chemical Co.), 8.2 g MDI (methylene diphenyl isocyanate, Fu-Pao Chemical Co.), and 64.9 g DMF (dimethylformamide, C-ECHO Co.) were added into a 500 ml three-inlet glass reactor having two agitating blades, and then stirred at a temperature of 105° C. After the reaction was completed, the temperature was cooled to room temperature to obtain the flame retardant. Then, 108 g of barium titanate (Seedchem Co.) and 1.1 g of graphite oxide (preparation example) were added to the resin formulation at room temperature to form a high-dielectric-constant formulation varnish. Finally, two copper foils were coated with the varnish respectively, and then the coated copper foils were laminated face to face at a temperature of 200° C. and pressed for 3 hours to obtain a slim capacitor.

Example 10

6.2 g TMA (trimellitic anhydride, Fu-Pao Chemical Co.), 20.7 g BMI (bismaleimide, KI Chemical Co.), 8.2 g MDI (methylene diphenyl isocyanate, Fu-Pao Chemical Co.), and 64.9 g DMF (dimethylformamide, C-ECHO Co.) were added into a 500 ml three-inlet glass reactor having two agitating blades, and then stirred at a temperature of 105° C. After the reaction was completed, the temperature was cooled to room temperature to obtain the flame retardant. Then, 140 g silicon carbide (SiC, Fujimi Co.) and 2 g graphite oxide (preparation example) were added to the resin formulation at room temperature to form a high-dielectric-constant formulation varnish. Finally, the formulation varnish was coated on an A1-back plate of a 5 W LED, wherein the temperature dropped before and after the coating was measured.

Example 11

6.2 g TMA (trimellitic anhydride, Fu-Pao Chemical Co.), 20.7 g BMI (bismaleimide, KI Chemical Co.), 8.2 g MDI (methylene diphenyl isocyanate, Fu-Pao Chemical Co.), and 64.9 g DMF (dimethylformamide, C-ECHO Co.) were added into a 500 ml three-inlet glass reactor having two agitating blades, and then stirred at a temperature of 105° C. After the reaction was completed, the temperature was cooled to room temperature to obtain the flame retardant. Then, 140 g silicon carbide (SiC, Fujimi Co.), and 0.8 g graphite oxide (preparation example) were added to the resin formulation at room temperature to form a high-dielectric-constant formulation varnish. Finally, the formulation varnish was coated on an Al-back plate of a 5 W LED, wherein the temperature dropped before and after the coating was measured.

Example 12

6.2 g TMA (trimellitic anhydride, Fu-Pao Chemical Co.), 20.7 g BMI (bismaleimide, KI Chemical Co.), 8.2 g MDI (methylene diphenyl isocyanate, Fu-Pao Chemical Co.), and 64.9 g DMF (dimethylformamide, C-ECHO Co.) were added into a 500 ml three-inlet glass reactor having two agitating blades, and then stirred at a temperature of 105° C. After the reaction was completed, the temperature was cooled to room temperature to obtain the flame retardant. Then, 140 g silicon carbide (SiC, Fujimi Co.), and 5.1 g graphite oxide (preparation example) were added to the resin formulation at room temperature to form a high-dielectric-constant formulation varnish. Finally, the formulation varnish was coated on an Al-back plate of a 5 W LED, wherein the temperature dropped before and after the coating was measured.

Example 13

6.2 g TMA (trimellitic anhydride, Fu-Pao Chemical Co.), 20.7 g BMI (bismaleimide, KI Chemical Co.), 8.2 g MDI (methylene diphenyl isocyanate, Fu-Pao Chemical Co.), and 80 g DMF (dimethylformamide, C-ECHO Co.) were added into a 500 ml three-inlet glass reactor having two agitating blades, and then stirred at a temperature of 105° C. After the reaction was completed, the temperature was cooled to room temperature to obtain the flame retardant. Then, 315 g silicon carbide (SiC, Fujimi Co.), and 5.1 g graphite oxide (preparation example) were added to the resin formulation at room temperature to form a high-dielectric-constant formulation varnish. Finally, the formulation varnish was coated on an Al-back plate of a 5 W LED, wherein the temperature dropped before and after the coating was measured.

Comparative Example 1

6.2 g TMA (trimellitic anhydride, Fu-Pao Chemical Co.), 20.7 g BMI (bismaleimide, KI Chemical Co.), 8.2 g MDI (methylene diphenyl isocyanate, Fu-Pao Chemical Co.), and 64.9 g DMF (dimethylformamide, C-ECHO Co.) were added into a 500 ml three-inlet glass reactor having two agitating blades, and then stirred at a temperature of 105° C. After the reaction was completed, the temperature was cooled to room temperature to obtain the flame retardant. Then, 108 g of barium titanate (Seedchem Co.) was added to the resin formulation at room temperature to form a halogen-free, phosphor-free and high-dielectric-constant formulation varnish. Finally, two copper foils were coated with the varnish respectively, and then the two copper foils coated with the formulation varnish were laminated face to face followed by heating and pressurization at a temperature of 200° C. for 3 hours to obtain a thin capacitor.

Comparative Example 2

6.2 g TMA (trimellitic anhydride, Fu-Pao Chemical Co.), 20.7 g BMI (bismaleimide, KI Chemical Co.), 8.2 g MDI (methylene diphenyl isocyanate, Fu-Pao Chemical Co.), and 64.9 g DMF (dimethylformamide, C-ECHO Co.) were added into a 500 ml three-inlet glass reactor having two agitating blades, and then stirred at a temperature of 105° C. After the reaction was completed, the temperature was cooled to room temperature to obtain the flame retardant. Then, 108 g of barium titanate (Seedchem Co.) and 1.1 g of fumed silica (Cabot Corp.) were added to the resin formulation at room temperature to form a halogen-free, phosphor-free and high-dielectric-constant formulation varnish. Finally, two copper foils were coated with the varnish respectively, and then the coated copper foils were laminated face to face at a temperature of 200° C. and pressed for 3 hours to obtain a slim capacitor.

Comparative Example 3

6.2 g TMA (trimellitic anhydride, Fu-Pao Chemical Co.), 20.7 g BMI (bismaleimide, KI Chemical Co.), 8.5 g IPDI (isophorone diisocyanate, Fu-Pao Chemical Co.), and 64.9 g DMF (dimethylformamide, C-ECHO Co.) were added into a 500 ml three-inlet glass reactor having two agitating blades, and then stirred at a temperature of 105° C. After the reaction was completed, the temperature was cooled to room temperature to obtain the flame retardant. Then, 108 g of barium titanate (Seedchem Co.) was added to the resin formulation at room temperature to form a halogen-free, phosphor-free and high-dielectric-constant formulation varnish. Finally, two copper foils were coated with the varnish respectively, and then the coated copper foils were laminated face to face at a temperature of 200° C. and pressed for 3 hours to obtain a slim capacitor.

Comparative Example 4

6.2 g TMA (trimellitic anhydride, Fu-Pao Chemical Co.), 20.7 g BMI (bismaleimide, KI Chemical Co.), 8.2 g MDI (methylene diphenyl isocyanate, Fu-Pao Chemical Co.), and 64.9 g DMF (dimethylformamide, C-ECHO Co.) were added into a 500 ml three-inlet glass reactor having two agitating blades, and then stirred at a temperature of 105° C. After the reaction was completed, the temperature was cooled to room temperature to obtain the flame retardant. Then, 140 g silicon carbide (SiC, Fujimi Co.) was added to the resin formulation at room temperature to form a high thermal radiation formulation varnish. Finally, the formulation varnish was coated on an Al-back plate of a 5 W LED, wherein the temperature dropped before and after the coating was measured.

TABLE 1

| | TMA (g) | c-TMA (g) | BMI (g) | MDI (g) | IPDI (g) | BaTiO$_3$ (g) | SiC (g) | GO (g) | PS720 (g) | Dk @1 MHz | TD (° C.) | Tg (° C.) | St (hr) | UL-94 |
|---|---|---|---|---|---|---|---|---|---|---|---|---|---|---|
| Example 1 | 6.2 | x | 20.7 | 8.2 | x | 108 | x | 1.1 | x | 21-23 | — | 211 | 3.5 | V0 |
| Example 2 | 6.2 | x | 20.7 | 8.2 | x | 20.9 | x | 0.2 | x | 11-12 | — | 209 | 3.6 | V0 |
| Example 3 | 6.2 | x | 20.7 | 8.2 | x | 108 | x | 4.5 | x | 22-23 | — | 212 | 4.8 | V0 |
| Example 4 | 6.2 | x | 20.7 | 20.2 | x | 108 | x | 1.1 | x | 16-18 | — | 186 | 3.6 | V0 |
| Example 5 | 6.2 | x | 20.7 | x | 8.5 | 108 | x | 1.1 | x | 17-19 | — | 186 | 3.4 | V0 |
| Example 6 | 6.2 | x | 35.1 | 8.2 | x | 108 | x | 1.1 | x | 18-20 | — | 204 | 3.7 | V0 |

TABLE 1-continued

The physical properties of the Examples and Comparative examples

| | TMA (g) | c-TMA (g) | BMI (g) | MDI (g) | IPDI (g) | BaTiO₃ (g) | SiC (g) | GO (g) | PS720 (g) | Dk @1 MHz | TD (° C.) | Tg (° C.) | St (hr) | UL-94 |
|---|---|---|---|---|---|---|---|---|---|---|---|---|---|---|
| Example 7 | 14.9 | x | 20.7 | 8.2 | x | 108 | x | 1.1 | x | 16-18 | — | 193 | 3.9 | V0 |
| Example 8 | x | 6.4 | 20.7 | x | 8.5 | 108 | x | 1.1 | x | 16-18 | — | 182 | 3.0 | V0 |
| Example 9 | x | 6.4 | 20.7 | 8.2 | x | 108 | x | 1.1 | x | 16-19 | — | 191 | 3.3 | V0 |
| Example 10 | 6.2 | x | 20.7 | 8.2 | x | x | 140 | 2 | x | — | 10 | 211 | 1.5 | V0 |
| Example 11 | 6.2 | x | 20.7 | 8.2 | x | x | 140 | 0.8 | x | — | 8 | 209 | 1.1 | V0 |
| Example 12 | 6.2 | x | 20.7 | 8.2 | x | x | 140 | 5.1 | x | — | 13 | 212 | 2.1 | V0 |
| Example 13 | 6.2 | x | 20.7 | 8.2 | x | x | 315 | 5.1 | x | — | 15 | 210 | 1.8 | V0 |
| Comparative Example 1 | 6.2 | x | 20.7 | 8.2 | x | 108 | x | x | x | 14-20 | — | 212 | 1.2 | V0 |
| Comparative Example 2 | 6.2 | x | 20.7 | 8.2 | x | 108 | x | x | 1.1 | 15-19 | — | 210 | 2.5 | V0 |
| Comparative Example 3 | 6.2 | x | 20.7 | x | x | 108 | x | x | x | 12-18 | — | 178 | 1.1 | V1 |
| Comparative Example 4 | 6.2 | x | 20.7 | 8.2 | x | x | 140 | x | x | — | 5 | 212 | 0.3 | V0 |

GO: graphite oxide
PS720: fumed silica
Dk: dielectric constant
TD: temperature drop
Tg: glass transition temperature
St: sedimentation time
X: not added
—: not measured In the absence of a dispersant, rapid aggregation and sedimentation easily occur when the inorganic powder is added to various kinds of resin formulation, which results in difficulty when performing a subsequent coating process. The inventors discovered that the graphite oxide can serve as the dispersant to promote the dispersibility of the inorganic powder in the resin formulation of the present embodiments, which increases the dielectric constant and stability of thermal radiation as well as defer the sedimentation time of the graphite oxide-containing resin formulation, thereby facilitating subsequent preparations of various kinds of resin composites, and providing a more uniform coating.

Referring to Table 1, the Examples of the present disclosure provide obvious improvements over the Comparative Examples. In the Examples, the variation range of dielectric constant is narrower (about 1-3), while in the Comparative Examples, the variation range of dielectric constant variation is comparatively wider (about 4-6). The result indicates that the high-dielectric-constant resin composite of the present embodiment has better stability in a dielectric constant. In addition, the glass transition temperatures (Tg) of the Examples are higher than 180° C., and the sedimentation times of the Examples are at least 3 hours, longer than that of Comparative Examples without using a dispersant or using silicon oxide as the dispersant (wherein the sedimentation time is 2.5 hours.)

The graphite oxide used in the present embodiment can serve as a dispersant of high-dielectric-constant powder as well as promote the dispersibility of the high thermal radiation powder. Thermal radiation powder easily sedimentates at the bottom of the composite resin formulation leading to difficulties when subsequent processing is performed. Moreover, when the formulation is coated into a film, this sedimentation feature makes the high thermal radiation powder easily encapsulated by the resin, thereby reducing thermal radiation efficiency. The graphite oxide may defer the sedimentation time of the thermal radiation powder in the high thermal radiation resin formulation, and thereby the high thermal radiation resin formulation may be applied to various kinds of subsequent coating process, such as blade coating, air gun coating, and brush coating, to provide a more uniform coating and improve thermal radiation efficiency for cooling. The high thermal radiation resin formulation may be applied to various kinds of heat sources for cooling through a transformation from waste heat to thermal radiation, thereby lowering the temperature of the heat sources.

While the invention has been described in detail and with reference to specific embodiments thereof, it is to be understood that the foregoing description is exemplary and explanatory in nature and is intended to illustrate the invention and its preferred embodiments. Through routine experimentation, one skilled in the art will readily recognize that various changes and modifications can be made therein without departing from the spirit and scope of the invention. Thus, the invention is intended to be defined not by the above description, but by the following claims and their equivalents.

What is claimed is:

1. A graphite oxide-containing resin formulation, consisting of:
   15-80 parts by weight of a polyamideimide precursor;
   0.01-10 parts by weight of a graphite oxide as a dispersant;
   10-400 parts by weight of an inorganic powder; and
   20-350 parts by weight of a solvent;
   wherein the polyamideimide precursor comprises: 2.5-25 parts by weight of carboxy anhydride; 5-30 parts by weight of diisocyanate; and 10-55 parts by weight of bismaleimide;
   wherein the carboxy anhydride has a formula I as below:

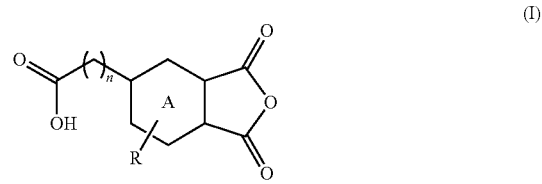

(I)

wherein A is cyclohexyl;
R is H, CH₃, or COOH; and
n is an integer of 0-8.

2. The graphite oxide-containing resin formulation of claim 1, wherein the diisocyanate comprises: methylene diphenyl diisocyanate, toluene diisocyanate, isophorone diisocyanate, or combinations thereof.

3. The graphite oxide-containing resin formulation of claim 1, wherein the inorganic powder is selected from the group consisting of barium oxide, calcium titanate, barium strontium titanate, lead zirconate titanate, lead magnesium niobate, silicon carbide, zirconium dioxide, and cerium (IV) oxide.

* * * * *